(12) United States Patent
Overfelt (10) Patent No.: US 8,317,628 B2
(45) Date of Patent: Nov. 27, 2012

(54) FLEXIBLE SHAFT CONNECTION AND METHOD

(75) Inventor: Travis Overfelt, Kansas City, MO (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 286 days.

(21) Appl. No.: 12/365,448

(22) Filed: Feb. 4, 2009

(65) Prior Publication Data

US 2010/0196086 A1    Aug. 5, 2010

(51) Int. Cl.
*F16D 3/50* (2006.01)
*F16B 7/18* (2006.01)

(52) U.S. Cl. .......................................... 464/99; 29/428

(58) Field of Classification Search .................. 464/78, 464/87, 98, 99, 102, 147; 267/159–164; 29/428, 888

See application file for complete search history.

(56) References Cited

U.S. PATENT DOCUMENTS

| | | | | |
|---|---|---|---|---|
| 1,445,272 A * | 2/1923 | Gill | ................................. | 464/99 |
| 1,454,087 A * | 5/1923 | Thomas | ........................... | 464/99 |
| 2,855,767 A * | 10/1958 | Gustav | ............................ | 464/98 |
| 3,677,031 A * | 7/1972 | Zierak et al. | .................... | 464/99 |
| 3,948,500 A * | 4/1976 | Korbuly et al. | | |
| 4,096,711 A * | 6/1978 | Carlson et al. | .................. | 464/99 |
| 4,523,916 A * | 6/1985 | Kizler et al. | .................... | 464/98 |
| 4,669,711 A * | 6/1987 | Beer | | |
| 5,219,314 A * | 6/1993 | Her et al. | ........................ | 464/98 |
| 5,545,090 A * | 8/1996 | Kirschey | ......................... | 464/99 |
| 5,655,756 A * | 8/1997 | Robinson | | |
| 5,938,533 A * | 8/1999 | Watanabe | ....................... | 464/98 |

FOREIGN PATENT DOCUMENTS

| | | | |
|---|---|---|---|
| CH | 606854 A5 * | 1/1979 | |
| CN | 2268145 Y | 11/1997 | |
| CN | 1428518 A | 7/2003 | |
| FR | 1021778 A * | 2/1953 | |

OTHER PUBLICATIONS

Chinese Office Action issued on Aug. 2, 2012 of the Chinese Application No. 201010112880.3.

* cited by examiner

*Primary Examiner* — Gregory Binda
*Assistant Examiner* — Joshua Skroupa
(74) *Attorney, Agent, or Firm* — Baker & Hostetler LLP (57) ABSTRACT

A coupling assembly that provides rotational shaft couplings or connections. The aforementioned coupling assembly pertains to such connections or couplings which can transmit rotational torque between two shafts and/or hubs, while accommodating center-line misalignment between the shafts on both sides of the coupling wherein the coupling assembly may be provided at each end of a shaft or the like.

22 Claims, 7 Drawing Sheets

FLEXIBLE SHAFT CONNECTION AND METHOD

FIELD OF THE INVENTION

The invention pertains generally to the field of rotational shaft couplings or connections. Further, the invention pertains to such connections or couplings which can transmit rotational torque between two shafts and/or hubs, while accommodating center-line misalignment between the shafts on both sides of the coupling.

BACKGROUND OF THE INVENTION

Various ways of coupling two rotational shafts and/or hubs together are known in the art. Often times, the couplings are used to transmit torque or rotational power from a drive shaft or hub to a driven drive shaft or hub. Thus, typically on one side of the coupling there is a power inducing device such as a motor, and on the other side of the coupling there is a shaft input to a power receiving device.

One example of such an arrangement is in a drive system for a fan used in an atmospheric cooling tower. In such a situation, it is common for the fan to be a relatively large horizontal or vertical axial fan. Often times, the blades are mounted to a hub and gear box in the center of the fan assembly, which is the axis about which the fan rotates. The gear box is often a 90 degree gear box, such that the axis of the input shaft to the gear box is at a right angle compared to the center line axis of the fan. Typically, a power transmission shaft extends from the center gear box along and past the radial swept area length of the fan, to a motor which is radially disposed outside the periphery of the fan. In this way, the motor is outside the swept area of the fan and does not block the air flow through the fan. Further, the gear box can be made relatively compact and rests in the center of the fan underneath the fan center hub.

The systems described above have proven highly satisfactory in use. However, particularly due to the length of the power transmission drive shaft, and to the construction of cooling towers in general, it has often been difficult to maintain a precise alignment between (1) the output shaft center axis of the motor, (2) the shaft center axis, and (3) the input shaft center axis of the gear box. Any misalignment is exacerbated by the relatively long length of the transmission shaft.

One solution to this issue has been to provide some form of torque tube or other rigid device spanning between the motor and the gear box. However, torque tubes do not always provide or maintain satisfactory alignment by themselves.

Accordingly, there is a need in the art for an improved connection or coupling which can be interposed at one or both ends of a shaft or hub, such as a driven shaft between a motor and a gear box, in order to accommodate misalignment that may occur.

SUMMARY OF THE INVENTION

Some embodiments of the invention provide an improved connection or coupling which can be interposed at one or both ends of a shaft or hub, such as a driven shaft between a motor and a gear box, in order to accommodate misalignment that may occur.

In one embodiment of the present invention, a coupling assembly for a fan drive in an atmospheric cooling tower has a flange member with a radially extending flange on a first outer pattern of attachment points and a flex element with a second outer pattern of fastener attachment points. The assembly also has a first inner pattern of fastener attachment points, a set of spacers disposed in between the first flex element and the flange and located between the first outer pattern and the second outer pattern of fastener attachment points, a collar having a third inner pattern of fastener attachment points, and a set of first fasteners that pass through all of the outer attachment points to fasten the flex element and the flange to each other maintaining spacing between the flange and the flex element due to the spacers being trapped therebetween. A second set of fasteners passes through all the inner attachment points to fasten the flex element and the collar together in an abutting relationship.

Another embodiment of the present invention details a coupling assembly comprising a flange member having a radially extending flange having a first outer pattern of fastener attachment points, a first flex element having a second outer pattern of fastener attachment points, and also having a first inner pattern of fastener attachment points, a second flex element having a third outer pattern of fastener attachment points, and also having a second inner pattern of fastener attachment points, a first set of spacers disposed in between the first flex element and the flange and located between the first outer pattern and the second outer pattern of fastener attachment points, a second set of spacers disposed between the first flex element and the second flex element and located between the second outer pattern and the third outer pattern of fastener attachment points, a collar having a third inner pattern of fastener attachment points, and a third set of spacers disposed between the first flex element and the second flex element between the first inner pattern and second inner pattern of fastener attachment points.

A further embodiment of the coupling assembly comprises a shaft, a first mounting means having a radially extending flange having a first outer pattern of fastener attachment points, a first flexing means having a second outer pattern of fastener attachment points, and also having a first inner pattern of fastener attachment points, a second flexing means having a third outer pattern of fastener attachment points, and also having a second inner pattern of fastener attachment points, a first set of spacing means disposed in between the first flexing means and the flange and located between the first outer pattern and the second outer pattern of fastener attachment points, a second set of spacing means disposed between the first flexing means and the second flexing means and located between the second outer pattern and the third outer pattern of fastener attachment points, a second mounting means having a third inner pattern of fastener attachment points, and a third set of spacing means disposed between the first flexing means and the second flexing means between the first inner pattern and second inner pattern of fastener attachment points.

Yet another embodiment relates to a fan drive assembly, which has a motor, a shaft, a gear box, a pair of couplings, one at each end of the shaft, one coupling joining the shaft to the motor, and one coupling joining the shaft to the gear box. Each coupling comprises a flange member having a radially extending flange having a first outer pattern of fastener attachment points, a first flex element having a second outer pattern of fastener attachment points, and also having a first inner pattern of fastener attachment points, a second flex element having a third outer pattern of fastener attachment points, and also having a second inner pattern of fastener attachment points, a first set of spacers disposed in between the first flex element and the flange and located between the first outer pattern and the second outer pattern of fastener attachment points, a second set of spacers disposed between the first flex element and the second flex element and located between the second outer pattern and the third outer pattern of fastener attachment points, a collar having a third inner pattern of fastener attachment points, a third set of spacers disposed between the first flex element and the second flex element between the first inner pattern and second inner pattern of fastener attachment points, and a hub.

In yet another embodiment, a coupling method provides a shaft wherein the coupling devices each comprise a flange member having a radially extending flange having a first outer pattern of fastener attachment points, a first flex element having a second outer pattern of fastener attachment points, and also having a first inner pattern of fastener attachment points, a second flex element having a third outer pattern of fastener attachment points, and also having a second inner pattern of fastener attachment points, a first set of spacers disposed in between the first flex element and the flange and located between the first outer pattern and the second outer pattern of fastener attachment points, a second set of spacers disposed between the first flex element and the second flex element and located between the second outer pattern and the third outer pattern of fastener attachment points, a collar having a third inner pattern of fastener attachment points, and a third set of spacers disposed between the first flex element and the second flex element between the first inner pattern and second inner pattern of fastener attachment points.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Some embodiments according to the present invention provide an improved connection or coupling which can be interposed at one or both ends of a shaft or hub, such as a driven shaft between a motor and a gear box, in order to accommodate misalignment that may occur.

The embodiments described herein in general relate to a coupling arrangement that can couple between two rotating shafts or hubs. The shafts may be, for example, longitudinal transmission shafts, or may be the input or output shafts of a motor or driven assembly such as a gear box. The word shaft here, then, refers to any rotational item such as a shaft, hub, flange, stub or other power transmitting member, whether solid or hollow, and whether having a cylindrical outer surface or whether having a round, hexagonal, square, octagonal, keyed, or any other shaped outer surface. Further, the description throughout herein will use the terms coupling and connector interchangeably, and no distinction between those terms is intended.

Figure 1:
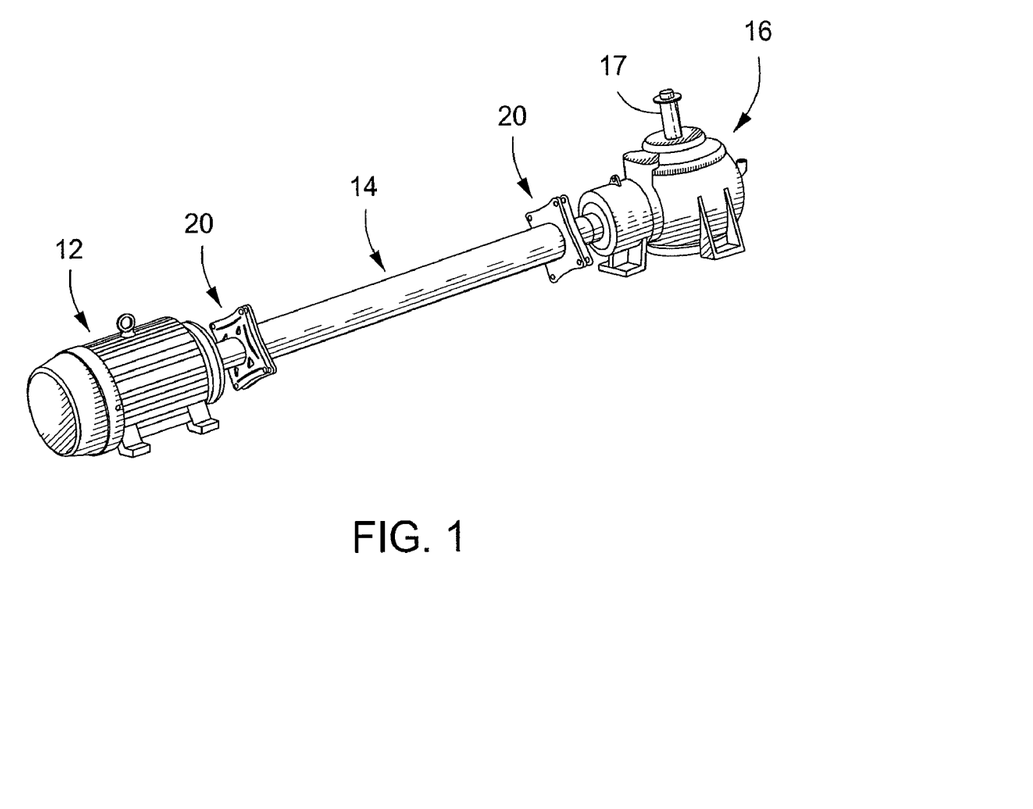
FIG. 1 is a perspective view showing a motor, a drive shaft, a gear box, and two flexible couplings according to a preferred embodiment of the present invention.

Some preferred embodiments of the invention will now be described with reference to the drawing figures in which like parts refer to like elements throughout. Turning to FIG. 1, a system is illustrated including a motor 12, which in this example is an electric motor, but could also be a hydraulic motor or any other type of rotational power source. A shaft 14 is illustrated which transmits rotational power and/or torque to a gear box 16. In the present example, the gear box 16 is a gear box that drives a fan having blades (not shown) extending radially outward from a shaft 17. A pair of couplings 20 are disposed at the opposed ends of the shaft 14. These couplings 20 transmit rotational power and/or torque on one end from the motor 12, and on the other end to the gear box 16.

Figure 2:
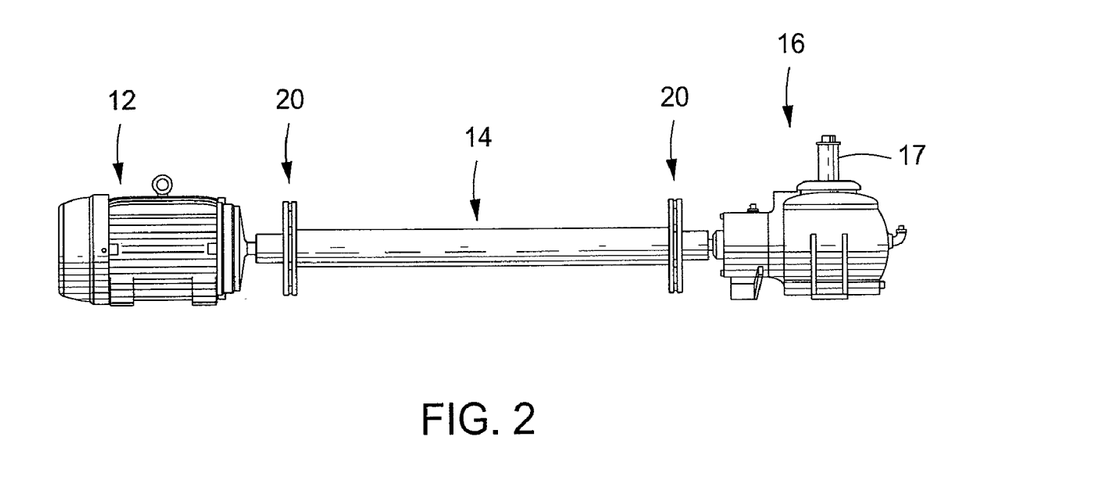
FIG. 2 is side view of the arrangement of FIG. 1.

The couplings 20 transmit such rotational power and/or torque, while accommodating some axial or angular misalignments between the center lines of the shaft 14 and the output shaft 12 and/or the input shaft of the gear box 16, respectively. These alignments can include purely angular misalignments between the center lines of the shafts, or also an offset type lateral alignment between the shafts, and/or combinations thereof. FIG. 2 shows a side view of the arrangement of FIG. 1.

Figure 3:
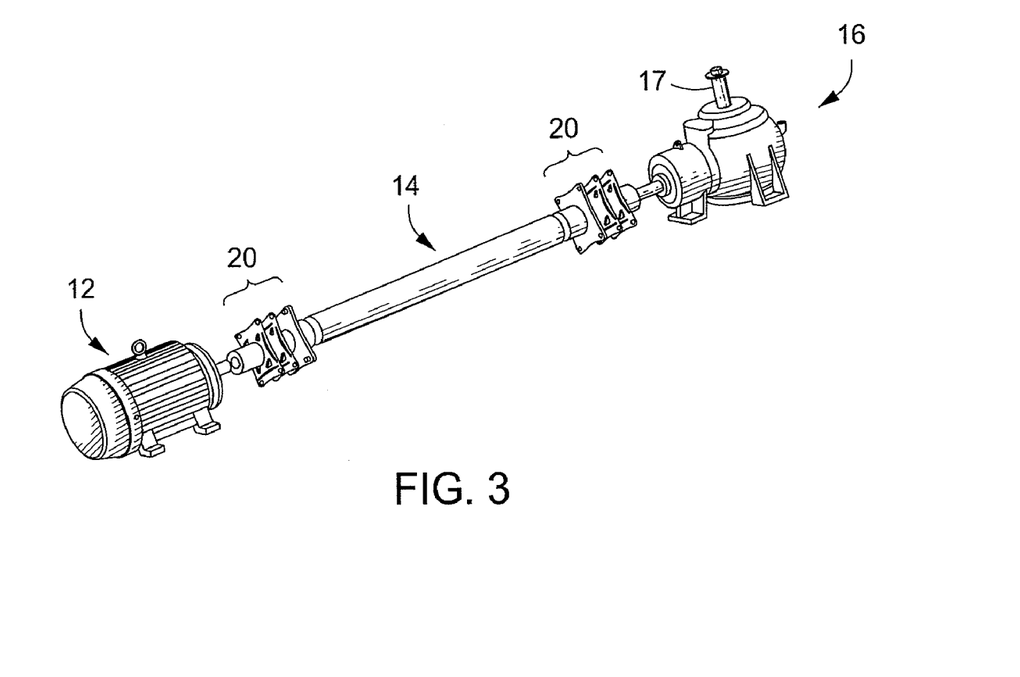
FIG. 3 is a partially exploded perspective view of the arrangement of FIG. 1.
Figure 4:
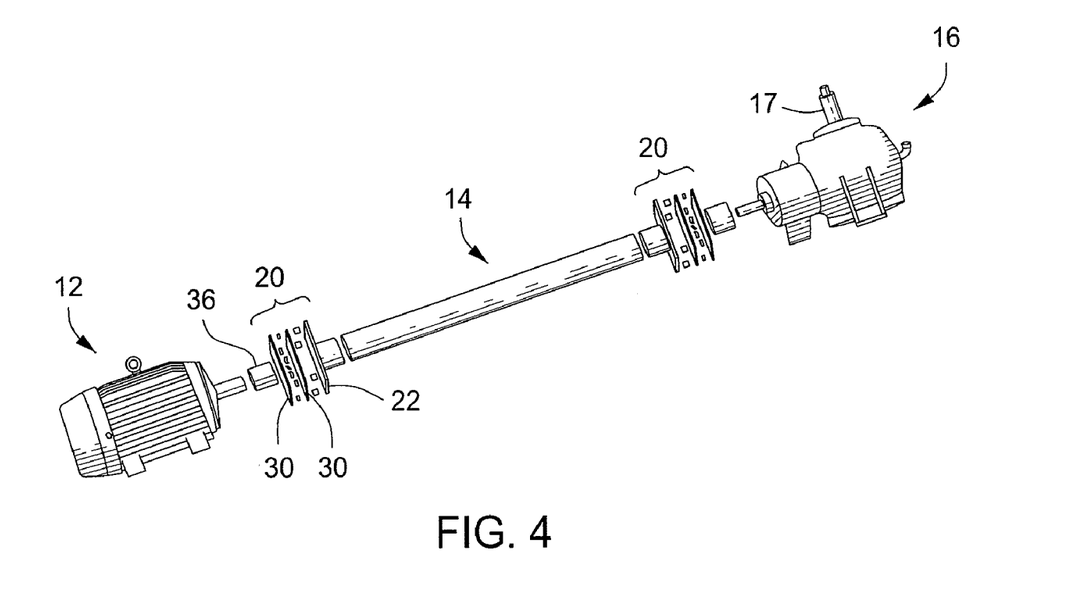
FIG. 4 is a further exploded perspective view of the arrangement of FIG. 1, taken from an angle different from that of FIG. 3.
Figure 5:
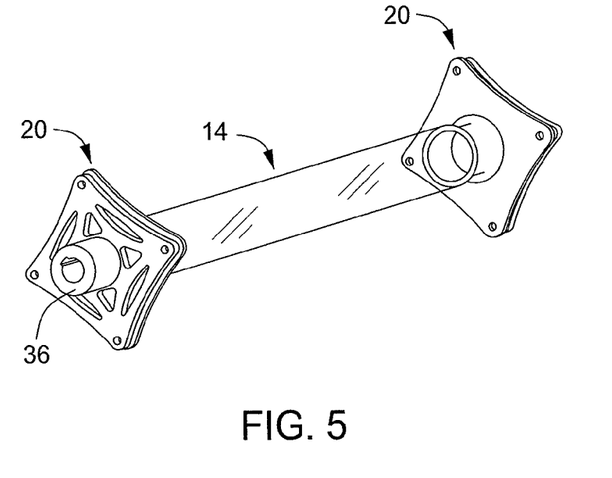
FIG. 5 is a view showing a drive shaft and two flexible couplings.
Figure 6:
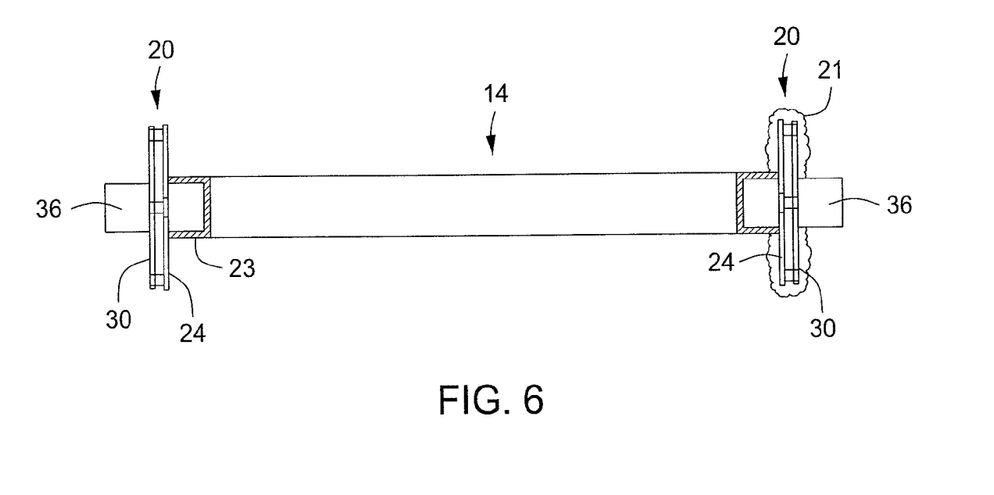
FIG. 6 is a side view of the arrangement of FIG. 5, further showing an embodiment wherein one of the flexible couplings features a coating on some parts thereof.
Figure 7:
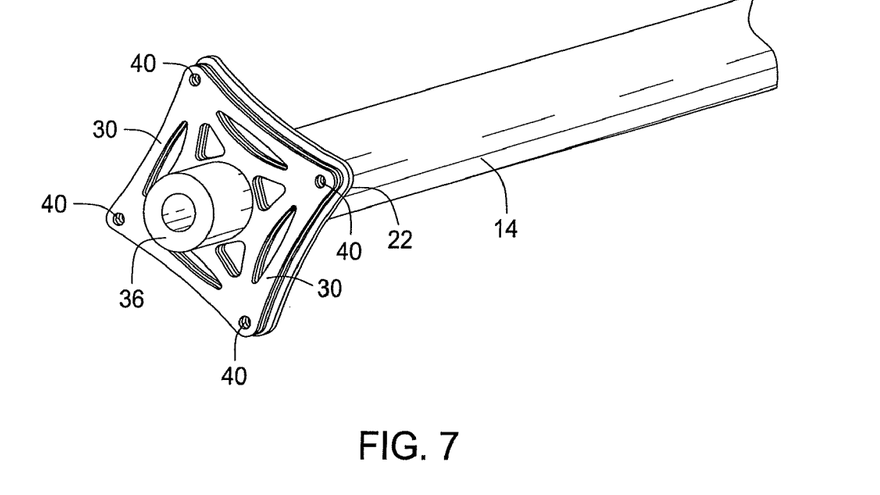
FIG. 7 is a perspective end view of the arrangement of FIG. 5, showing further details thereof.
Figure 8:
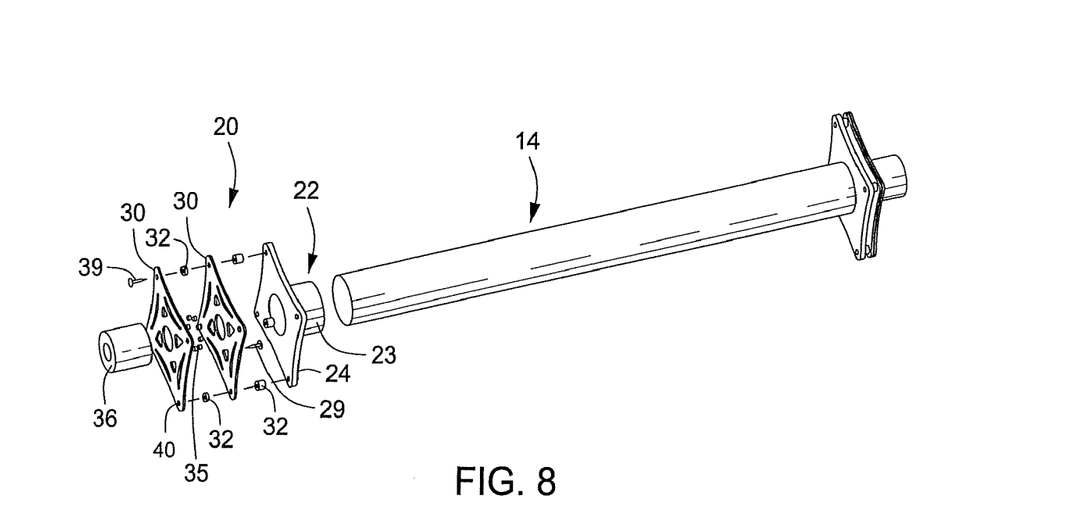
FIG. 8 is a partially exploded view of the arrangement of FIG. 5, showing further details thereof.

Turning to FIGS. 3 and 4, further details of the couplings 20 are shown. In particular, each coupling 20 includes four major components. Each coupling 20 has a flange member 22, which is attached to the shaft 14, typically by bonding or other rigid attachment method. The coupling 20 further includes two flex elements 30, which are relatively thin plates or discs and are described further below. Each coupling 20 also includes a collar 36, which is a stub shaft that has inner or outer features in order to be mated to the output shaft of the motor 12, or the input shaft of the driven device such as the gear box 16. In the examples shown, the shaft 14 is a hollow shaft, which may be made of any suitable material such as, for example, carbon fiber tubing, or metal. Turning to FIGS. 5 and 6, it will be appreciated that when assembled, the flange member 22 includes a cylindrical portion 23 having an outer diameter to fit in the inner diameter of the shaft 14 and be bonded thereto. With further reference to FIG. 8, the flange 22 also has a radially extending flat flange portion 24, in addition to a cylindrical insert portion 23.

Continuing with reference to FIGS. 5-9, it will be appreciated that the flange portion 24 has a set of (in this case four) fastener holes 40 therethrough. Aligned with these fastener holes are a series of (in this case four) spacer/washers 28. The couplings 20 each include a pair of flex elements 30, which each also have a set of matching (in this case four) fastener holes 40, with spacer/washers 32 between the pair of flex hubs at the locations of the holes 40. In this way, it will be appreciated a fastener 39 can be inserted through a series of holes 40, a washer 32, a again the holes 40, a washer 28, and into or through a hole 25, and tightened either by being tightened into threaded hole 25, or by a nut (not shown) on the opposite side of the flange 24. Therefore, an assembly is created as shown in side views in FIG. 6, wherein two flex elements 30 are mounted essentially parallel to, but spaced apart from, the flange 24. Further, the flex elements 30 are spaced apart from each other, in a preferred embodiment by a distance less than a spacing from the middle flex element to the flange 24.

Figure 10:
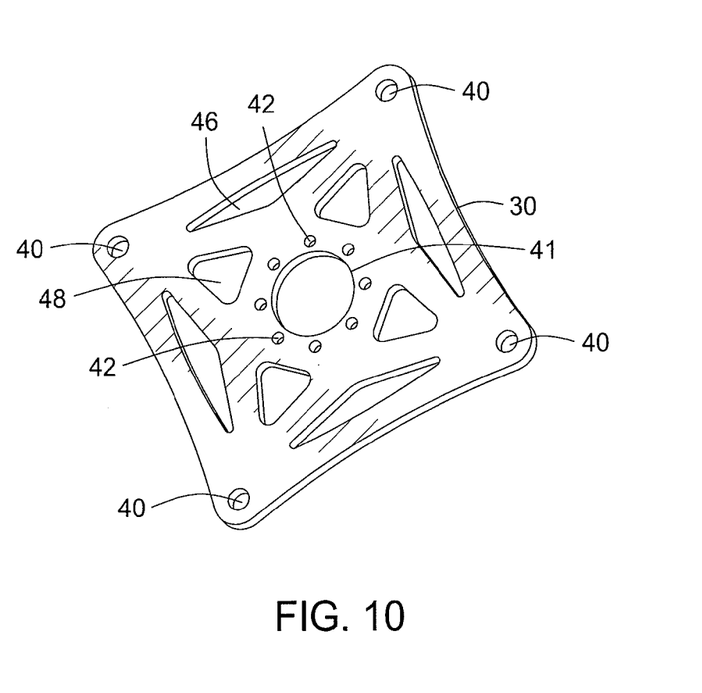
FIG. 10 is a perspective view of an individual flex element according to the embodiment illustrated in FIGS. 1-9.

Further, as best seen in FIG. 10, each of the flex elements 30 has near an inner circle 41 a circular ring of (in this case eight) fastener holes 42. A matching ring of (in this case eight) spacer/washers 35 is provided between the two flex elements 30, and though not visible due to the angle, the collar 36 has a matching ring of (in this case eight) threaded fastener bores. Thus, fasteners 29 can be inserted through first hole 42, a washer 35, a second hole 42, and the respective receiving bore in the collar 36. In this way, again, an arrangement is formed such as shown on the left side in FIG. 6, with the flex elements 30 spaced apart for each other, and one flex element abutting the collar 36. Given the arrangement shown above, as far as practical assembly, it may be most practical to first assemble the collar to two of the flex elements 30, and then to attach the collar and joint flex element assembly as one piece together onto the flange 24.

FIG. 6 on its right side shows an alternative embodiment wherein an elastomeric coating 21 has been applied around parts of the coupling 20 in order to seal parts of the coupling 20. In one embodiment the collar 36 and flex elements 30 are coated, but the hub 22 is not coated; this facilitates replacement of the flex elements 30 without damaging the coating or need to re-apply any coatings. A unit of flex elements 30 and collar 36 can be pre-coated before installation. Thus, the coating feature is illustrated only schematically, and some or all components can be coated (alone or together). If the elastomeric coating 21 is suitably resilient, it can seep in between various parts of the coupling 20 without interfering with its function. Such coatings 21 on some form of pre-molded covers can be used on any couplings where suitable.

The flange member 22 should be of a design that is easily bondable or attachable to the shaft 14, for example by adhesive insertion of the cylindrical portion 23, and further which is stiff and rigid enough to provide fastener mounting locations (holes 25) for attachment to the flex elements 30. The flange element 22 may be made of some form of steel, or preferably a composite such as, e.g, fiberglass and epoxy. Also, although the flange member 22 is shown as a component that is originally separate from the shaft 14, depending on the shaft manufacturing employed, the shaft 14 and the flange element 22 may be in some form unitary.

The flex elements 30 are typically relatively thin plates, and can be made of steel, including for example carbon steel or stainless steel, or preferably be a composite. These materials provide a desirable resilient or spring-back flex property. If the embodiment utilizes the coating 21 shown in FIG. 6, then the corrosion performance of the material is less important, depending on the environment which the couplings 20 are used. However, if the coating 21 is omitted, a weather or corrosion resistant material such as stainless steel may be preferred.

Figure 9:
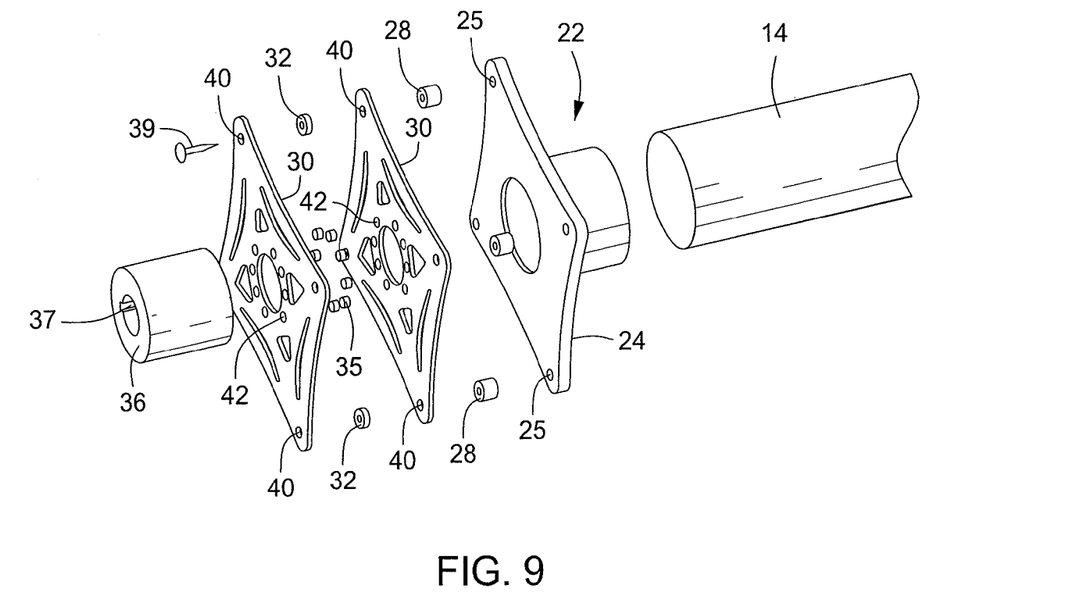
FIG. 9 is a close up exploded view showing details according to FIG. 8.

Turning to FIG. 9, it will be appreciated that the collar 36 shows a key-way 37, shown by way of example only to illustrate that the collar 36 can be rotationally locked to some shaft, such as the output shaft of a motor 12.

Turning to FIG. 10, it will be appreciated that the example shown of a flex element 30 has a relatively square outer profile and cutouts 46 and 48. These cutout regions 46 and 48 allow the flex element 30 to bend, and in particular allow the region of the flex element having the fastener holes 40 to tilt geometrically relatively to the region of the flex elements having the fastener holes 42. Since the fasteners 29 are ultimately attached to the collar 36, and the fasteners 39 are ultimately attached to the flange member 22 and thus indirectly to the shaft 14, this flexing permits accommodation of misalignment between the collar 36 and the shaft 14 itself.

Figure 11:
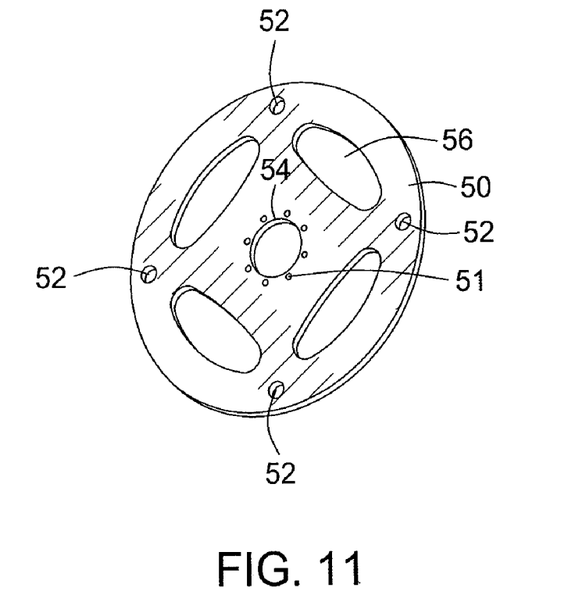
FIG. 11 is a perspective view of an alternative flex element providing an alternative flex element embodiment that can be used in the arrangements of FIGS. 1-9.
Figure 12:
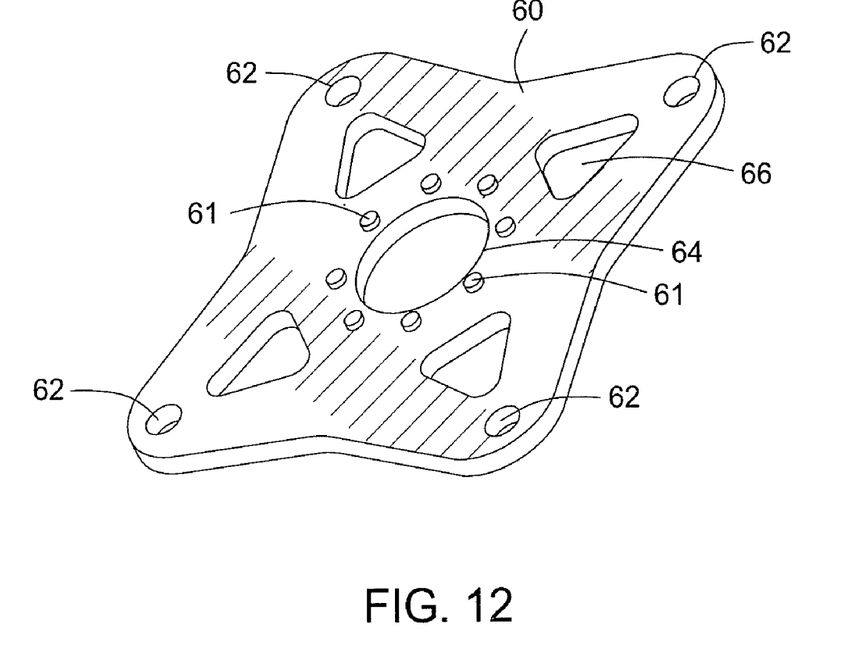
FIG. 12 is a perspective view of an alternative flex element providing an alternative flex element embodiment that can be used in the arrangements of FIGS. 1-9.

FIG. 11 shows a different shape of a flex element 50, in this case having center aperture 54, a ring of fastener holes 51, an outer ring of fastener holes 52, and four cutouts 56. FIG. 12 shows another embodiment of a flex element 60, in this case having an inner aperture 64, an inner ring of inner bolts 61, an outer ring of fastener holes 62, and four cutouts 66. The shape shown in FIGS. 11 and 12 also serve the same general function as that of FIG. 10.

Although the preferred embodiments have been described in the context of being on both ends of a shaft which is driving a fan in a cooling tower, the couplings can have wide range of applicability, and in some arrangements only one coupling may be employed rather than two. In further arrangements, more than two couplings may be employed. Further, such couplings can be used outside of the fan drive implementation and outside of the cooling tower industry.

Figure 13:
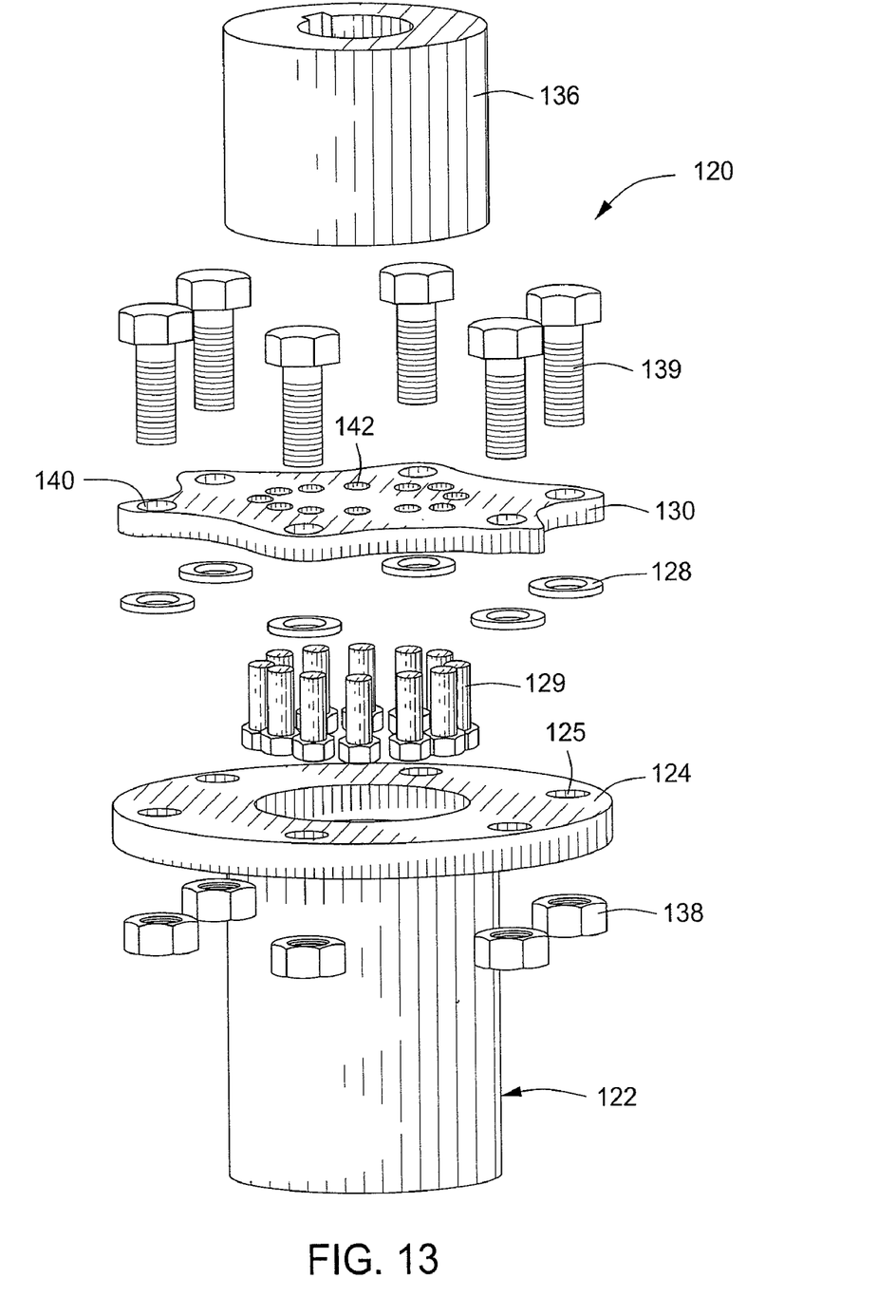
FIG. 13 is an exploded view of an alternative embodiment of a coupling using a single flex element.

FIG. 13 is an exploded view of an alternative embodiment of a coupling with the single flex element. Some of the embodiments described above use two flex elements, with spacers in between the two flex elements. Of course, more than two flex elements can be used according to various alternative embodiments of the invention. Additionally, embodiments are possible using only a single flex element, as illustrated in FIG. 13. FIG. 13 shows a coupling element 120 which can be used in some or all of the same applications as discussed above for the other embodiments. The coupling 120 has a flange member 122 which is attached to the shaft similar to the previously described embodiments. The coupling further includes a single flex element 130. The flex element 130 may be substantially similar to any of the flex elements 30 described above, and includes passing therethrough an outer ring of fastener holes 140, as well as an inner ring of fastener holes 142. In the embodiment illustrated, the flex element 130 does not have a central aperture therethrough. It will be appreciated in all embodiments the flex elements 30 or 130 can feature central apertures or not, and can also feature additional supplemental cutout or relief regions or not. The single flex element 130 in this embodiment can be manufactured of steel or composite, similar to the previous embodiments, and is preferably a relatively thin flat disc, as in the previous embodiments. The coupling 120 as illustrated in FIG. 13, also includes a flange 124, washers or spacers 128, and bolts 139 that interact with nuts 138, so that the bolts 139 can affix the flex element 130 against the washers 125 and thus spaced apart from the flange 124. Bolt holes 125 are provided to receive the bolts 139, and can either be threaded or the nuts 138 can be used.

In addition in this embodiment, a set of inner fasteners 129 are provided, which pass through holes 142 in the flex element 130 and into receiving bores (not shown) in the face of the hub or collar 136, such that tightening the fasteners 129 pulls the flex element 130 flush with the end face of the collar 136 and mounts it thereto.

The various embodiments discussed above can be used to connect shafts or hubs anywhere along a drive system, but in some examples are used to connect a motor to a fan gear drive box. In the embodiments illustrated many of the Figures herein, the drive shaft is a relatively elongated shaft. However, it will be appreciated that couplings such as described herein, can also be used in close-coupled arrangements, wherein the shaft is very short, or even the coupling on one end is directly attached to the motor and on its other end is directly attached to the gear drive box.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A coupling assembly for a fan drive in an atmospheric cooling tower, comprising:
    a flange member having a radially extending flange having a first outer pattern of attachment points;
    a flex element having a second outer pattern of fastener attachment points, and also having a first inner pattern of fastener attachment points, wherein said flex element comprises a plurality of discs stacked adjacent one another wherein said flex element is coated with an elastomeric coating;
    a set of spacers wherein a spacer is disposed in between each individual disc of said plurality of discs and located between the first outer pattern and the second outer pattern of fastener attachment points;
    a collar having a second inner pattern of fastener attachment points; and
    a set of first fasteners that pass through all of the outer attachment points to fasten the flex element and the flange to each other maintaining spacing between the flange and the flex element due to the spacers being trapped therebetween; and
    a second set of fasteners that pass through all the inner attachment points, to fasten the flex element and the collar together in an abutting relationship.

2. The coupling of claim 1, wherein the first fasteners comprise bolts having a head on one end and a nut on the other end.

3. The coupling of claim 1, wherein the second fasteners comprise screws that screw into threaded bores in the collar.

4. A coupling assembly for a fan drive in an atmospheric cooling tower comprising:
    a flange member having a radially extending flange having a first outer pattern of fastener attachment points;
    a first flex element having a second outer pattern of fastener attachment points, and also having a first inner pattern of fastener attachment points;
    a second flex element having a third outer pattern of fastener attachment points, and also having a second inner pattern of fastener attachment points;
    a first set of spacers disposed in between said flange and said first flex element and located between the first outer pattern and the second outer pattern of fastener attachment points;
    a second set of spacers disposed between the first flex element and the second flex element and located between the second outer pattern and the third outer pattern of fastener attachment points;
    a collar having a third inner pattern of fastener attachment points; and
    a third set of spacers disposed between the first flex element and the second flex element between the first inner pattern and second inner pattern of fastener attachment points,
    wherein an elastomeric coating encases said first and second flex element.

5. The coupling of claim 4, further comprising a plurality of first fasteners that pass through all of the outer attachments points and through the first and second set of spacers to fasten the first and second flex elements and the flange to each other maintaining spacing between the flange and the elements.

6. The coupling of claim 4, further comprising a plurality of second fasteners that pass through all the inner attachment points and through the third set of spacers to fasten the first flex element, the second flex element and the collar together, maintaining spacing between the first and second flex elements.

7. The coupling of claim 4, comprising a plurality of first fasteners that pass through all of the outer attachment points and through the first and second set of spacers to fasten the first and second flex elements and the flange to each other maintaining spacing between the flange and flex elements, and a plurality of second fasteners that pass through all the inner attachment points and through the third set of spacers to fasten the first flex element, the second flex element and the collar together, maintaining spacing between the first and second flex elements.

8. The coupling of claim 4, wherein the spacers are in the shape of washers.

9. The coupling of claim 4, further comprising a plurality of cutout regions disposed on each flex element and located at least outside of the diameter of the inner attachment points, and inside the diameter of the outer attachment points.

10. The coupling of claim 4, wherein each flex element comprises a disc.

11. A coupling assembly for a fan drive in an atmospheric cooling tower, comprising:
    a shaft;
    a first mounting means having a radially extending flange having a first outer pattern of fastener attachment points;
    a first flexing means having a second outer pattern of fastener attachment points, and also having a first inner pattern of fastener attachment points;
    a second flexing means having a third outer pattern of fastener attachment points, and also having a second inner pattern of fastener attachment points;

a first set of spacing means disposed in between said flange and said first flexing means and located between the first outer pattern and the second outer pattern of fastener attachment points;

a second set of spacing means disposed between the first flexing means and the second flexing means and located between the second outer pattern and the third outer pattern of fastener attachment points; and a second mounting means having a third inner pattern of fastener attachment points;

a third set of spacing means disposed between the first flexing means and the second flexing means between the first inner pattern and second inner pattern of fastener attachment points wherein an elastomeric coating encases said first and second flexing means.

12. The coupling of claim 11, further comprising a plurality of first fasteners that pass through all of the outer attachment points and through the first and second set of spacing means to fasten the second flexing means and the flange to each other maintaining spacing between the flange and the elements.

13. The coupling of claim 11, further comprising a plurality of second fasteners that pass through all the inner attachment points and through the third set of spacing means to fasten the first flexing means, the second flexing means and the collar together, maintaining spacing between the first and second flexing means.

14. The coupling of claim 11, comprising a plurality of first fasteners that pass through all of the outer attachment points and through the first and second set of spacing means to fasten the first and second flexing means and the flange to each other maintaining spacing between the flange and flexing means, and a plurality of second fasteners that pass through all the inner attachment points and through the third set of spacing means to fasten the first flexing means, the second flexing means and the collar together, maintaining a spacing between the first and second flexing means.

15. The coupling of claim 11, wherein the spacing means are in the shape of washers.

16. The coupling of claim 11, further comprising a plurality of cutout regions disposed on each flexing means and located at least outside of the diameter of the inner attachment points, and inside the diameter of the outer attachment points.

17. The coupling of claim 11, wherein each flexing means comprises a disc.

18. A fan drive assembly for an atmospheric cooling tower comprising:
  a motor;
  a shaft;
  a gear box;
  a pair of couplings, one at each end of the shaft, one coupling joining the shaft to the motor, and one coupling joining the shaft to the gear box;
  wherein each coupling comprises:
    a flange member having a radially extending flange having a first outer pattern of fastener attachment points;
    a first flex element having a second outer pattern of fastener attachment points, and also having a first inner pattern of fastener attachment points;
    a second flex element having a third outer pattern of fastener attachment points, and also having a second inner pattern of fastener attachment points;
    a first set of spacers disposed in between said flange and said first flex element and located between the first outer pattern and the second outer pattern of fastener attachment points;
    a second set of spacers disposed between the first flex element and the second flex element and located between the second outer pattern and the third outer pattern of fastener attachment points;
    a collar having a third inner pattern of fastener attachment points;
    a third set of spacers disposed between the first flex element and the second flex element between the first inner pattern and second inner pattern of fastener attachment points,
  wherein an elastomeric coating encases said first and second flex element.

19. The coupling of claim 18, wherein each coupling further comprises a plurality of first fasteners that pass through all of the outer attachment points and through the first and second set of spacers to fasten the first and second flex elements and the flange to each other maintaining spacing between the flange and flex elements, and a plurality of second fasteners that pass through all the inner attachment points and through the third set of spacers to fasten the first flex element, the second flex element and the collar together, maintaining a spacing between the first and second flex elements.

20. A coupling method for a fan drive in an atmospheric cooling tower, comprising:
  providing a shaft;
  providing a pair of coupling devices at either end of the shaft, wherein the coupling devices each comprise:
    a flange member having a radially extending flange having a first outer pattern of fastener attachment points;
    a first flex element having a second outer pattern of fastener attachment points, and also having a first inner pattern of fastener attachment points;
    a second flex element having a third outer pattern of fastener attachment points, and also having a second inner pattern of fastener attachment points;
    a first set of spacers disposed in between said flange and said first flex element and located between the first outer pattern and the second outer pattern of fastener attachment points;
    a second set of spacers disposed between the first flex element and the second flex element and located between the second outer pattern and the third outer pattern of fastener attachment points;
    a collar having a third inner pattern of fastener attachment points; and
    a third set of spacers disposed between the first flex element and the second flex element between the first inner pattern and second inner pattern of fastener attachment points,
  wherein an elastomeric coating encases said first and second flex element.

21. The coupling method of claim 20, wherein each coupling further includes a plurality of first fasteners that pass through all of the outer attachment points and through the first and second set of spacers to fasten the first and second flex elements and the flange to each other maintaining spacing between the flange and flex elements, and a plurality of second fasteners that pass through all the inner attachment points and through the third set of spacers to fasten the first flex element, the second flex element and the collar together, maintaining a spacing between the first and second flex elements.

22. A coupling assembly for a fan drive in an atmospheric cooling tower, comprising:
  a flange member having a radially extending flange having a first outer pattern of attachment points;

a flex element having a second outer pattern of fastener attachment points, and also having a first inner pattern of fastener attachment points, wherein said flex element comprises a plurality of discs stacked adjacent one another wherein said flex element is coated with an elastomeric coating;

a collar having a second inner pattern of fastener attachment points; and a set of first fasteners that pass through all of the outer attachment points to fasten the flex element and the flange to each other maintaining spacing between the flange and the flex element due to a set of spacers, wherein a spacer is disposed in between each individual disc of said plurality of discs and located between the first outer pattern and the second outer pattern of fastener attachment points; and a second set of fasteners that pass through all the inner attachment points, to fasten the flex element and the collar together in an abutting relationship.

* * * * *